United States Patent
Kim et al.

(10) Patent No.: US 9,229,844 B2
(45) Date of Patent: Jan. 5, 2016

(54) SYSTEM AND METHOD FOR MONITORING WEB SERVICE

(71) Applicant: SAMSUNG SDS CO., LTD., Seoul (KR)

(72) Inventors: Sundeuk Kim, Seoul (KR); Hyun-Taek Oh, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 329 days.

(21) Appl. No.: 13/891,601

(22) Filed: May 10, 2013

(65) Prior Publication Data

US 2013/0305096 A1 Nov. 14, 2013

(30) Foreign Application Priority Data

May 11, 2012 (KR) .................. 10-2012-0050200

(51) Int. Cl.
*G06F 11/36* (2006.01)

(52) U.S. Cl.
CPC ........ *G06F 11/3668* (2013.01); *G06F 11/3688* (2013.01)

(58) Field of Classification Search
CPC ............ G06F 11/3668; G06F 11/3688; G06F 11/3692
USPC ............... 714/28, 32, 38.1; 717/741
See application file for complete search history.

(56) References Cited

U.S. PATENT DOCUMENTS

| | | | |
|---|---|---|---|
| 7,330,887 B1 * | 2/2008 | Dharmadhikari | 709/224 |
| 7,356,590 B2 * | 4/2008 | Wilson et al. | 709/224 |
| 2002/0104071 A1 * | 8/2002 | Charisius et al. | 717/109 |
| 2004/0117479 A1 * | 6/2004 | Jellum et al. | 709/224 |
| 2006/0200477 A1 * | 9/2006 | Barrenechea | 707/100 |
| 2006/0276997 A1 * | 12/2006 | Drees | 702/182 |
| 2008/0016499 A1 * | 1/2008 | Jones et al. | 717/124 |
| 2008/0127097 A1 * | 5/2008 | Zhao et al. | 717/124 |
| 2008/0288215 A1 * | 11/2008 | Duberry | 702/186 |
| 2009/0235282 A1 * | 9/2009 | Meijer et al. | 719/320 |
| 2009/0300423 A1 * | 12/2009 | Ferris | 714/38 |
| 2011/0125832 A1 * | 5/2011 | Dahl | 709/203 |
| 2011/0191747 A1 * | 8/2011 | Charisius et al. | 717/103 |
| 2013/0086203 A1 * | 4/2013 | Avner et al. | 709/217 |
| 2013/0139130 A1 * | 5/2013 | Anjan et al. | 717/131 |
| 2014/0089107 A1 * | 3/2014 | De Jager et al. | 705/14.73 |
| 2014/0109061 A1 * | 4/2014 | Gibbens et al. | 717/126 |
| 2014/0195858 A1 * | 7/2014 | Cohen | 714/38.14 |

FOREIGN PATENT DOCUMENTS

| | | | |
|---|---|---|---|
| CN | 103309800 A | * | 9/2013 |
| KR | 10-2004-0035572 A | | 4/2004 |

OTHER PUBLICATIONS

Communication, dated Oct. 15, 2013, issued by the Korean Intellectual Property Office in counterpart Korean Patent Application No. 10-2012-0050200.

* cited by examiner

*Primary Examiner* — Chae Ko
(74) *Attorney, Agent, or Firm* — Sughrue Mion, PLLC

(57) ABSTRACT

Provided are a system and a method for monitoring a web service. The web service monitoring system includes a management module configured to provide an interface for receiving an test scenario and a policy for a simulation test of a target system from an administrator and outputting the simulation test result of the target system to the administrator, a database configured to store the received policy and test scenario, and an agent configured to access the target system according to the test scenario and the policy stored in the database and carry out the simulation test of the target system.

24 Claims, 6 Drawing Sheets

SYSTEM AND METHOD FOR MONITORING WEB SERVICE

CROSS-REFERENCE TO RELATED APPLICATION

This application claims priority to and the benefit of Republic of Korea Patent Application No. 10-2012-0050200, filed on May 11, 2012, the disclosure of which is incorporated herein by reference in its entirety.

BACKGROUND

1. Field

The present disclosure relates to technology for monitoring a web service using an agent, and more particularly, to a system and a method for monitoring a web service.

2. Discussion of Related Art

With the recent development of Internet technology, various kinds of web services are being provided in networks. While existing web services merely provide simple text and image, provided services such as Internet banking, issue of a certificate, and home trading have remarkably increased in range as well as number lately.

Since web services have been diversified and complicated as mentioned above, it is necessary to frequently monitor whether or not web services operate normally so as to smoothly provide the web services. However, existing web service monitoring involves an administrator accessing the corresponding web service and actually trying to perform respective functions and thus is inconvenient, and accurate monitoring is difficult. In addition, a web service may be provided only when a browser application program interface (API) or application is downloaded and installed. In this case, it is practically impossible for an administrator to check whether or not the browser API or application is downloaded and installed normally.

SUMMARY

The present disclosure is directed to providing a system and method for automatically monitoring whether or not functions provided by a web service are performed normally using an agent.

According to an aspect of the present disclosure, there is provided a system for monitoring a web service including: a management module configured to provide an interface for receiving an test scenario and a policy for a simulation test of a target system from an administrator, and outputting the simulation test result of the target system to the administrator; a database configured to store the received policy and test scenario; and an agent configured to access the target system according to the test scenario and the policy stored in the database, and carry out the simulation test of the target system.

The system for monitoring a web service may further include a service module configured to receive and provide the test scenario and the policy stored in the database to the agent, and transmit the test result received from the agent to the management module.

The test scenario may include at least one of an access address of the target system, account information for the target system, and information on a target browser application program interface (API) and a target application.

The target browser API and target application information may include at least one of installation locations (directory) of the target browser API and the target application, and version information and registry information on the target browser API and the target application.

The policy may include at least one of a monitoring type of the target system, a monitoring period, the number of reattempts upon occurrence of an error during monitoring, a log record range, a period for checking whether or not the policy is changed, a test time limit (timeout) upon occurrence of an error, and whether or not to collect an accessed page address.

The agent may include: a first sub-agent configured to make a monitoring schedule for the target system according to the test scenario and the policy received from the service module; and a second sub-agent configured to perform monitoring on the target system according to the schedule made by the first sub-agent. Here, the first sub-agent may transmit results of the monitoring performed by the second sub-agent to the service module.

When a memory occupied by the second sub-agent in the system for monitoring a web service exceeds a previously set value, the first sub-agent may restart the second sub-agent.

The second sub-agent may access a login web page of the target system according to the monitoring schedule made by the first sub-agent, structurize the accessed login web page, extract an object for login to the target system, add account information to the extracted object, transmit the object to the target system, and thereby request login to the target system.

The second sub-agent may structurize the accessed web page using a document object model (DOM).

The second sub-agent may determine whether or not the login request has been completed normally according to whether or not a previously set login complete web page is loaded normally.

Whether or not the login complete web page is loaded normally may be determined according to whether or not completion of download of the web page is notified by a web browser control included in the agent.

The second sub-agent may access a browser API installation web page or a browser API execution web page of the target system according to the monitoring schedule made by the first sub-agent, download a browser API installation file according to browser API installation information included in the accessed web page and install the browser API in a virtual machine, or execute a previously installed browser API.

The second sub-agent may determine whether or not the browser API has been installed or executed normally according to whether or not a previously set complete page is loaded normally.

Whether or not the complete page is loaded normally may be determined according to whether or not completion of download of the complete page is notified by a web browser control included in the agent.

When it is determined that the browser API has not been installed or executed normally, the second sub-agent may transmit an error message including error page information, an installation location of the browser API, and version information and registry information on the browser API received from the target system to the first sub-agent, and the first sub-agent may compare the received error message with the test scenario and transmit the comparison results to the service module.

The second sub-agent may access an application installation web page or an application execution web page of the target system according to the monitoring schedule made by the first sub-agent, and install the application in the virtual machine according to application information included in the accessed web page, or execute the previously installed application.

The second sub-agent may determine whether or not the application has been installed normally according to whether or not a previously set installation complete page is loaded normally, or an installation normal finish message is received from an application installation process of the virtual machine.

The second sub-agent may determine whether or not the application is executed normally according to whether or not a previously set execution complete page is loaded normally, or a normal execution message of the application is received from an application installation process of the virtual machine.

Whether or not the installation complete page or the execution complete page is loaded normally may be determined according to whether or not completion of download of the installation complete page or the execution complete page is notified by a web browser control included in the agent.

When it is determined that the application has not been installed or executed normally, the second sub-agent may transmit an error message including error page information, an installation location of the application, and version information, registry information and process information on the application received from the target system to the first sub-agent, and the first sub-agent may compare the received error message with the test scenario and transmit the comparison results to the service module.

According to another aspect of the present disclosure, there is provided a method of monitoring a web service including: receiving, at an agent of a web service monitoring system, a login test request for a target system; accessing, at the agent, a login web page of the target system; structurizing, at the agent, the accessed login web page and extracting an object for login to the target system; requesting, at the agent, login to the target system by adding account information to the extracted object and transmitting the object to the target system; and determining, at the agent, whether or not the login to the target system has been completed normally.

Extracting the object may include structurizing the login web page using a DOM.

Determining whether or not the login has been completed normally may include determining whether or not the login has been completed normally according to whether or not a previously set login complete web page is loaded normally.

Whether or not the login complete web page is loaded normally may be determined according to whether or not completion of download of the login complete web page is notified by a web browser control included in the agent.

The method may further include: before accessing the login web page, determining, at the agent, whether or not there is a session previously established with the target system; and when it is determined that there is a previously established session, closing, at the agent, the session.

According to still another aspect of the present disclosure, there is provided a method of monitoring a web service including: receiving, at an agent of a web service monitoring system, a browser API installation test request for a target system; accessing, at the agent, a browser API installation web page of the target system; installing, at the agent, a browser API in a virtual machine by downloading a browser API installation file according to browser API installation information included in the accessed web page and executing the downloaded browser API installation file; and determining, at the agent, whether or not the browser API has been installed normally.

According to yet another aspect of the present disclosure, there is provided a method of monitoring a web service including: receiving, at an agent of a web service monitoring system, an application installation test request for a target system; accessing, at the agent, an application installation web page of the target system; installing, at the agent, a browser API in a virtual machine according to browser API installation information included in the accessed web page; installing, at the agent, an application in the virtual machine by downloading an application installation file from the target system according to application installation information included in the installed browser API and executing the downloaded installation file; and determining, at the agent, whether or not the application has been installed normally.

According to yet another aspect of the present disclosure, there is provided a method of monitoring a web service including: receiving, at an agent of a web service monitoring system, a browser API execution test request for a target system; accessing, at the agent, a browser API-installed web page of the target system; executing, at the agent, a browser API according to browser API information included in the accessed web page; and determining, at the agent, whether or not the browser API is executed normally.

According to yet another aspect of the present disclosure, there is provided a method of monitoring a web service including: receiving, at an agent of a web service monitoring system, an application execution test request for a target system; accessing, at the agent, an application-installed web page of the target system; executing, at the agent, a browser API according to browser API information included in the accessed web page; executing, at the agent, an application according to application information included in the executed browser API; and determining, at the agent, whether or not the application is executed normally.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided to efficiently describe the spirit of the present disclosure to those of ordinary skill in the art.

Figure 1:
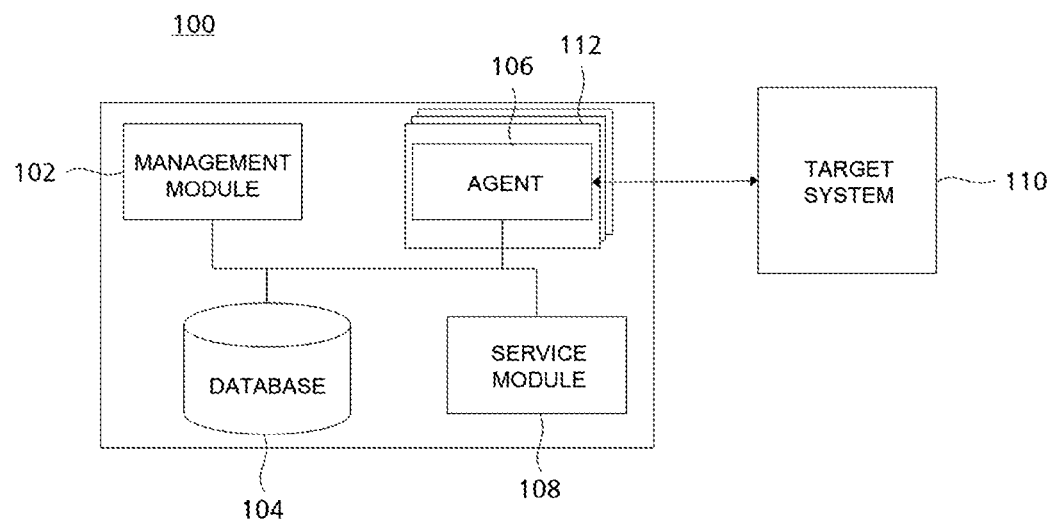
FIG. 1 is a block diagram of a system for monitoring a web service according to an exemplary embodiment of the present disclosure.

FIG. 1 is a block diagram of a system 100 for monitoring a web service according to an exemplary embodiment of the present disclosure. The web service monitoring system 100 according to an exemplary embodiment of the present disclosure is intended to carry out a simulation test of whether or not a target system operates normally, and output a result of the simulation test. The web service monitoring system 100 is configured to access the target system using a virtual machine, virtually perform a function such as login, browser application program interface (API) (e.g., ActiveX) installation, or application installation, and then output the result of the function to an administrator or store the result in a database. Here, the target system is a general system for providing a web service on the Internet, and denotes a web site providing user account issue and login functions, a browser API or application installation function, etc., and so on. For example, a target system of the present disclosure may be a web page of a bank, a stock firm, a public office, etc., an intra-network, an Internet shopping mall, etc. of a company, etc., and so on.

Meanwhile, a browser API is a technique additionally installed in a web browser to provide a function that is not supported by the web browser, a function of connecting a general application installed in a terminal of a user with the web, etc., and has a comprehensive concept including an add-on program, ActiveX, a plug-in, and so on.

In addition, an application is a program separately installed in a user terminal and executed, unlike a browser API. In the present disclosure, an application particularly denotes a program that is downloaded from a web page through the aforementioned browser API, and installed in a user terminal or executed. In other words, a web browser generally has a limitation in directly installing an application in a user terminal or execute the application, and thus in the present disclosure, a specific application is installed or executed on a browser via a browser API.

As shown in the drawing, the web service monitoring system 100 according to an exemplary embodiment of the present disclosure includes a management module 102, a database 104, an agent 106, and a service module 108.

The management module 102 provides an interface for receiving an test scenario and a policy for a simulation test of a target system 110 from an administrator, and outputting the simulation test result of the target system 110 to the administrator. The management module 102 may be configured on the basis of the web, and accordingly, the administrator can access the management module 102 through a web browser, or so on.

The database 104 stores and manages the policy and the test scenario input by the administrator through the management module 102. Also, the database 104 may be configured to store and manage the result of a test of the target system carried out by the agent 106 that will be described later.

In an exemplary embodiment of the present disclosure, the test scenario is a set of related information for accessing the target system 110 and carrying out the test. The test scenario may include at least one of an access address of the target system 110, account information for the target system 110, and target browser API and target application information.

As an example, when the test scenario is intended to test a login function of the target system 110, the test scenario may include a login web page address (uniform resource locator (URL)) of the target system 110, account information (an identity (ID), a password, etc.) for logging in the target system 110, an address of a web page loaded when login succeeds, and so on. In the case of a multi-factor authentication-based web service involving issue of a certificate, account information (a social security number, a security card number, etc.) for issuing the certificate may be further included.

As another example, when the test scenario is intended to test a browser API installation function of the target system 110, the test scenario may include a browser API installation web page address of the target system 110, an installation location (directory) of a browser API to be installed, version information on the browser API, registry information added when the browser API is installed, an address of a web page loaded when the installation of the browser API is completed normally.

As another example, when the test scenario is intended to test an application installation function of the target system 110, the test scenario may include an application installation web page address of the target system 110, an installation location (directory) of an application to be installed, version information on the application, registry information added when the application is installed, an address of a web page loaded when the installation of the application is completed normally.

Meanwhile, the policy is a set value necessary to access the target system 110 and carry out the test. The policy may include at least one of a monitoring (test) type of the target system 110, a monitoring period, the number of reattempts upon occurrence of an error during monitoring, a log record range, a period for checking whether or not the policy is changed, a test time limit (timeout) upon occurrence of an error, and whether or not to collect an accessed page address.

Among these, the monitoring type denotes a function to be tested among functions provided by the target system 110. For example, the monitoring type may include login, issue of a certificate, installation or execution of a browser API, installation or execution of an application, and so on.

The log record range determines a level to which a log generated during a test will be recorded. For example, the log record range may be classified as recording of all logs, recording upon generation of an alarm message, recording upon generation of a notification message, recording upon occurrence of an error, and so on.

Whether or not to collect an accessed page address denotes whether or not to collect an address of a web page accessed for a test of the target system 110.

The agent 106 accesses the target system 110 according to the test scenario and the policy stored in the database 104 and carry out a simulation test of the target system 110. The agent 106 is installed in a virtual machine 112 in the web service monitoring system 100. The virtual machine 112 is an environment of a general user computer implemented in the web service monitoring system 100, and the web service monitoring system 100 installed in the virtual machine 112 can access the target system 110 and carry out a simulation test of the target system 110 as if it were a general user. Since a technique for implementing a virtual machine having a separate computing environment in a general computer system is well known to those of ordinary skill in the art, detailed description thereof will be omitted here.

In an exemplary embodiment of the present disclosure, the web service monitoring system 100 may include at least one virtual machine 112. Also, each virtual machine 112 has a separate agent 106 such that the web service monitoring system 100 can simultaneously access at least one target system 110 and carry out a simulation test. A detailed constitution of such an agent 106 will be described in detail with reference to FIG. 2.

The service module 108 handles communication between the management module 102 and the agent 106, receiving an test scenario and a policy stored in the database 104 through the management module and providing the received test scenario and policy to the agent 106. Also, when a test of the agent 106 is completed, the service module 108 receives the test result from the agent 106 and transmits the test result to the management module 102. The management module 102 receiving the test result may output the received result to the administrator, or store the received result in the database 104.

Figure 2:
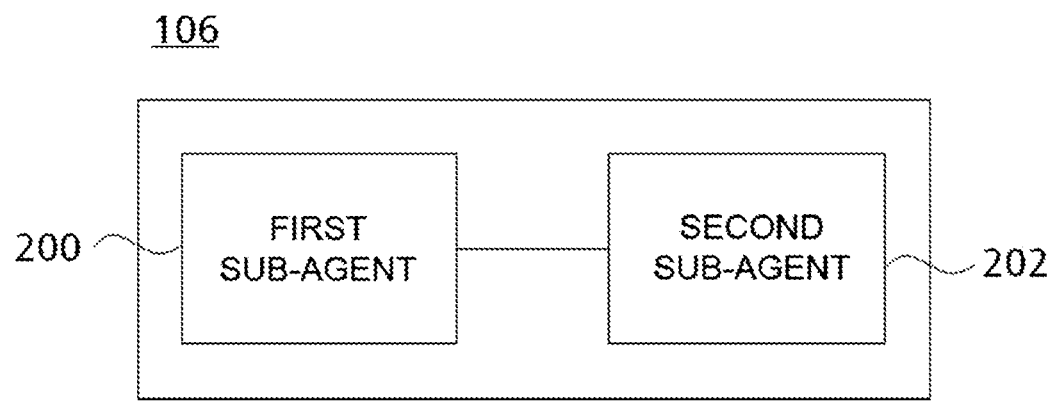
FIG. 2 is a detailed block diagram of an agent according to an exemplary embodiment of the present disclosure.

FIG. 2 is a detailed block diagram of the agent 106 according to an exemplary embodiment of the present disclosure. As shown in the drawing, the agent 106 according to an exemplary embodiment of the present disclosure includes a first sub-agent 200 and a second sub-agent 202.

The first sub-agent 200 makes a monitoring schedule for the target system 110 according to an test scenario and a policy received from the service module 108. For example, the first sub-agent 200 may schedule a web page access sequence of the target system 110, the number of reattempts upon occurrence of an error, an idle time in a test, etc. according to the received test scenario and policy. Also, when a test result is received from the second sub-agent 202, the first sub-agent 200 transmits the received test result to the service module 108.

In addition, when a memory occupied by the second sub-agent 202 in the web service monitoring system 100 exceeds a previously set value, the first sub-agent 200 restart the second sub-agent 202, thereby preventing malfunction of the second sub-agent 202 from causing a fault in operation of the web service monitoring system 100. For example, in a process in which the second sub-agent 202 carries out a test such as installation of an application, a memory is not released normally due to an error, or so on. In this case, the first sub-agent 200 restarts the second sub-agent 202, thereby preventing a memory problem caused by the second sub-agent 202.

The second sub-agent 202 carries out a simulation test of the target system 110 according to the schedule made by the first sub-agent 200, and transfers the test result to the first sub-agent 200. The second sub-agent 202 functions to request a web page from the target system 110 or download a browser API, etc. in the same way as a general web browser. Also, the second sub-agent 202 includes a web browser control therein, and when the second sub-agent 202 completes loading of a web page is completed or connects to another page, the web browser control causes the corresponding event (e.g., a document complete event).

When the agent 106 consists of the first sub-agent 200 and the second sub-agent 202 as described above, even if a web service to be monitored is changed, it is all right to change only a setting of the first sub-agent 200, and thus it is possible to effectively cope with a variety of web services. However, these are merely functional classification, and in actual implementation, the first sub-agent 200 and the second sub-agent 202 may be configured as a single process substantially performed in one virtual machine, or separate processes as needed.

A detailed simulation test method of the web service monitoring system 100 having the above-described constitution will be described below.

Figure 3:
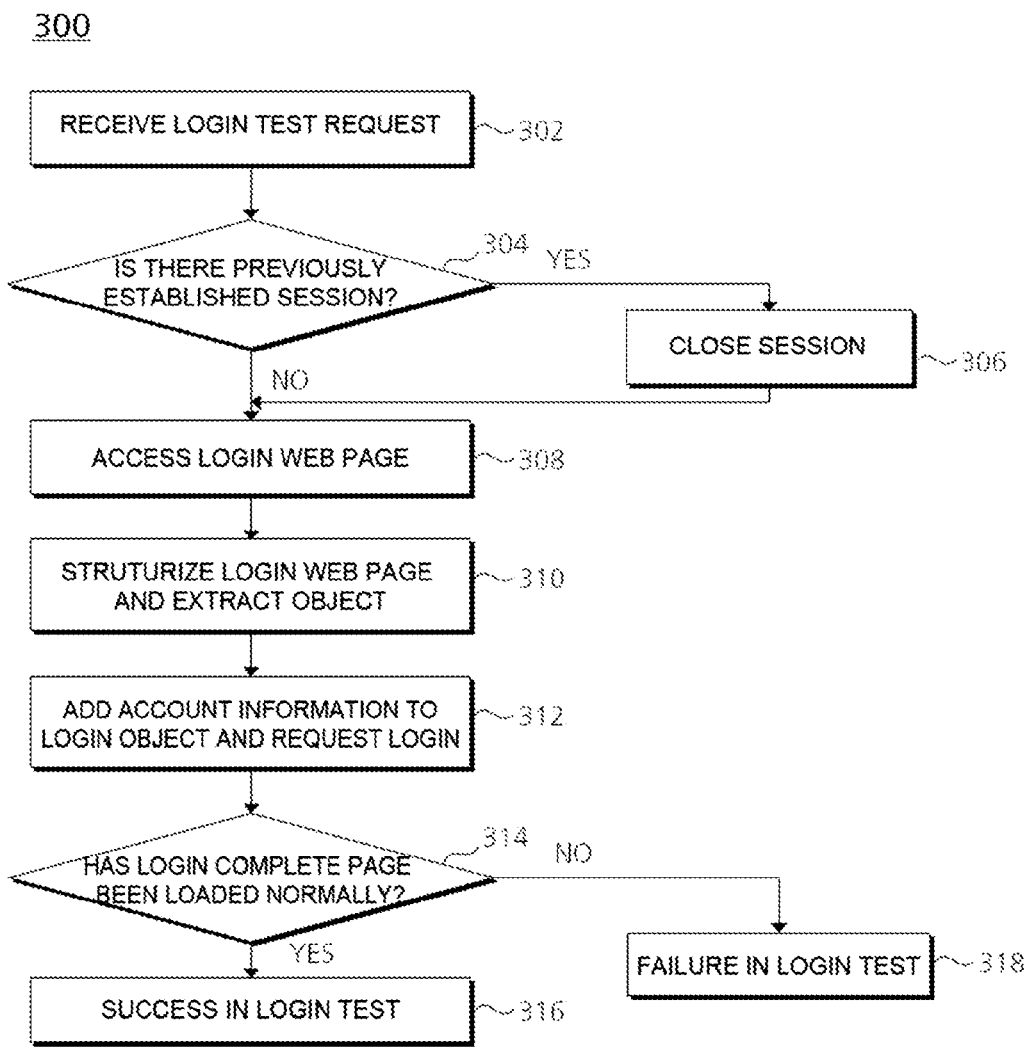
FIG. 3 is a flowchart illustrating a login simulation test process for a target system in a system for monitoring a web service according to an exemplary embodiment of the present disclosure.

FIG. 3 is a flowchart illustrating a login simulation test process 300 for the target system 110 in the web service monitoring system 100 according to an exemplary embodiment of the present disclosure.

The first sub-agent 200 receives an test scenario and a policy for a login test from the service module 108, makes a simulation test schedule according to the received test scenario and policy, and then transmits a login test request including the schedule to the second sub-agent 202 (302).

The second sub-agent 202 receiving the login test request determines whether or not there is a session previously established with the target system 110 first (304). When there is a previously established session, the second sub-agent 202 closes the session (306). This is because the login test is not properly carried out when login to the target system has already been completed before the test.

Next, the second sub-agent 202 accesses a login web page of the target system 110, and downloads content of the login web page (308).

When the content is downloaded, the second sub-agent 202 structurizes the downloaded content, extracts an object for login to the target system 110 (310), and requests login to the target system 110 by adding account information to the extracted object and transmitting the object to the target system 110 (312).

Step 310 may be configured to structurize the content of the login web page using a document object model (DOM). In general, a document on the web denotes a structurized document such as hypertext markup language (HTML) or extensible markup language (XML), and structurization of a document denotes an operation of recognizing such a document on the web as a set of specific objects rather than a simple set of characters. For example, in the case of HTML, structurization can be performed by recognizing respective tags (TABLE, TR, DIV, SPAN, etc.) for presenting a document as separate objects. Thus, when the aforementioned DOM, etc. is used, an object related to login (input box, etc.) can be separated from the login web page, and by adding the previously set account information to the separated object, it is possible to request login to the target system 110 even without an actual web browser.

Subsequently, the second sub-agent 202 determined whether the login to the target system 110 has been completed normally (314). Whether or not the login has been completed normally may be determined according to whether or not a previously set login complete web page is loaded normally. Most web sites are configured to automatically connect to specific web pages when login is completed, and the second sub-agent 202 has address information on a web page which will be connected to according to the schedule received from the first sub-agent 200 when the login is completed. Accordingly, the second sub-agent 202 can know whether or not the login has succeeded by comparing an address of a web page loaded after requesting the login with the information. Here, when completion of download of the web page is notified by the web browser control, the second sub-agent 202 determines that the login complete web page has been loaded normally. A notification of the completion of download of the web page may be, for example, a document complete event caused by the web browser control. However, the present disclosure is not limited to a document complete event, and the type of an event that happens when download of the web page is completed may vary according to the type of a web browser.

When it is determined in step 314 that the login complete web page has been loaded normally, the second sub-agent 202 determines that the login test has succeeded, and transmits the test result to the first sub-agent 200 (316). On the other hand, when the login complete web page has not been loaded normally, the second sub-agent 202 determines that the login test has failed, and transmits the test result to the first sub-agent 200 (318).

Figure 4:
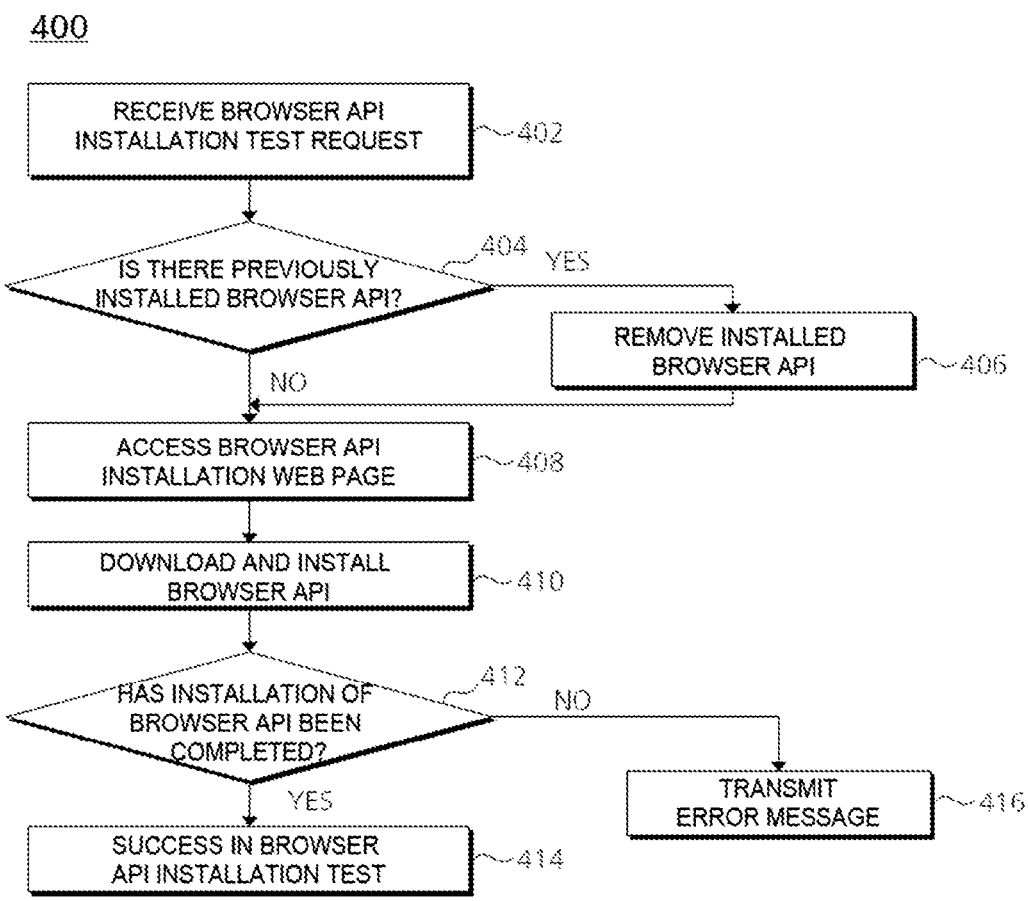
FIG. 4 is a flowchart illustrating a browser application program interface (API) installation simulation test process in a system for monitoring a web service according to an exemplary embodiment of the present disclosure.

FIG. 4 is a flowchart illustrating a browser API installation simulation test process 400 in the web service monitoring system 100 according to an exemplary embodiment of the present disclosure.

The first sub-agent 200 receives an test scenario and a policy for a browser API installation simulation test from the service module 108, makes a simulation test schedule according to the received test scenario and policy, and then transmits a browser API installation test request including the schedule to the second sub-agent 202 (402).

The second sub-agent 202 receiving the test request determines whether or not there is a previously installed browser API first (404). When there is a previously installed browser API, the second sub-agent 202 removes the browser API (406). This is because the test is not properly carried out when a browser API has already been installed before the test.

Next, the second sub-agent 202 accesses a browser API installation web page of the target system 110 (408), downloads a browser API installation file according to browser API installation information included in the accessed web page, and executes the downloaded browser API installation file to install a browser API in the virtual machine 112 (410).

Subsequently, the second sub-agent 202 determines whether or not the browser API has been installed normally (412). A browser API such as ActiveX is configured to connect to a previously set specific page (referred to as a browser API installation complete web page) when installed in a user system completely and normally, and the second sub-agent 202 has address information on the browser API installation complete web page according to the schedule received from the first sub-agent 200. Accordingly, the second sub-agent 202 can know whether or not the installation of the browser API has succeeded by comparing an address of a web page loaded after the installation of the browser API with the information. Here, when completion of download of the web page is notified by the web browser control (e.g., when a document complete event happens), the second sub-agent 202 determines that the browser API installation complete web page has been loaded normally.

When it is determined in step 412 that the browser API installation complete web page has been loaded normally, the second sub-agent 202 determines that the browser API installation test has succeeded, and transmits the test result to the first sub-agent 200 (414). On the other hand, when the browser API installation complete web page has not been loaded normally, the second sub-agent 202 determines that the browser API installation test has failed, and transmits an error message including installation error web page information, an installation location of the browser API, and version information and registry information on the browser API received from the target system 110 to the first sub-agent 200 (416).

Figure 5:
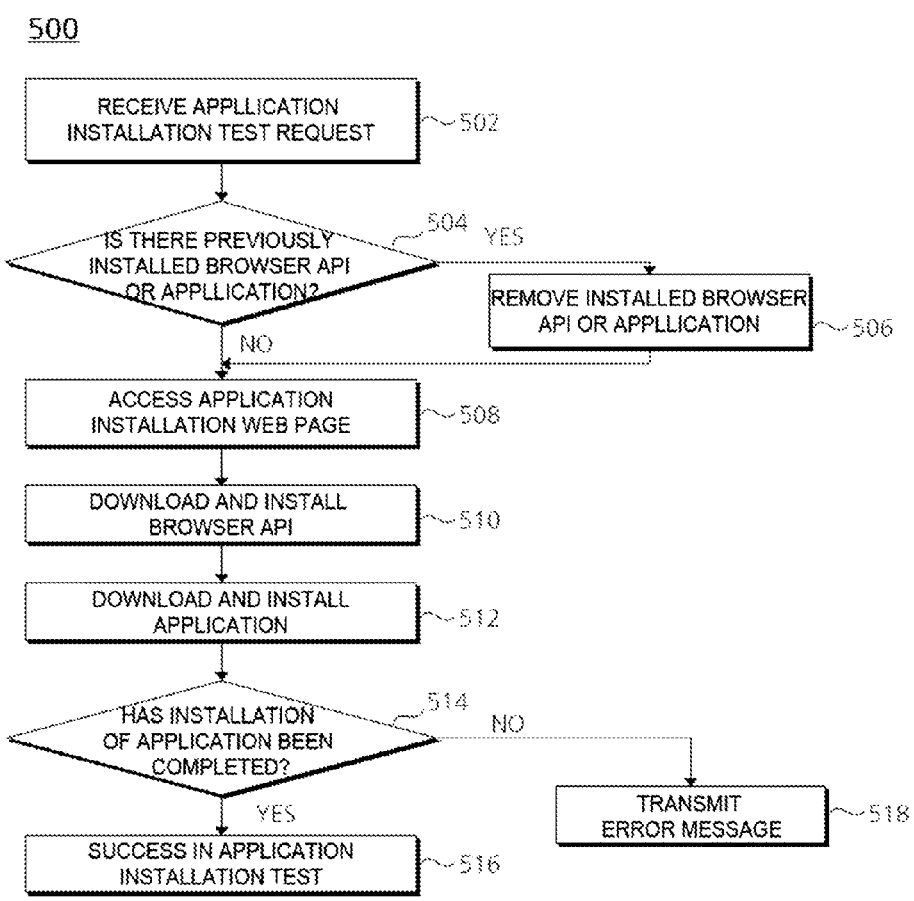
FIG. 5 is a flowchart illustrating an application installation simulation test process in a system for monitoring a web service according to an exemplary embodiment of the present disclosure.

FIG. 5 is a flowchart illustrating an application installation simulation test process 500 in the web service monitoring system 100 according to an exemplary embodiment of the present disclosure.

The first sub-agent 200 receives an test scenario and a policy for an application installation simulation test from the service module 108, makes a simulation test schedule according to the received test scenario and policy, and then transmits an application installation test request including the schedule to the second sub-agent 202 (502).

The second sub-agent 202 receiving the test request determines whether or not there is a previously installed browser API or application first (504). When there is a previously installed browser API or application, the second sub-agent 202 removes the browser API or application (506). This is because the test is not properly carried out when a browser API or application has already been installed in the virtual machine 112 before the test.

Next, the second sub-agent 202 accesses an application installation web page of the target system 110 (508), downloads a browser API installation file according to browser API installation information included in the accessed web page, and executes the downloaded browser API installation file to install a browser API in the virtual machine 112 (510). The browser API installed at this time is used to install the application. Since it is impossible for a web browser to install or execute a specific application directly in a user system, in the present disclosure, a browser API is installed and executed first, and the application is installed or executed using the executed browser API.

Next, the second sub-agent 202 downloads an application installation file from the target system 110 according to application installation information included in the installed browser API, and installs an application in the virtual machine 112 by executing the downloaded installation file (512).

Subsequently, the second sub-agent 202 determines whether or not the application has been installed normally (514). The browser API installed in step 510 is configured to sense completion of the installation of the application and connect to a previously set specific page (referred to as an application installation complete web page) when the installation of the application is completed normally, and the second sub-agent 202 has address information on the browser API installation complete web page according to the schedule received from the first sub-agent 200. Accordingly, the second sub-agent 202 can know whether or not the installation of the application has succeeded by comparing an address of a web page loaded after the installation of the browser API with the information after the installation of the application is completed. Here, when completion of download of the web page is notified by the web browser control (e.g., when a document complete event happens), the second sub-agent 202 determines that the application installation complete web page has been loaded normally.

Alternatively, when an installation normal finish message is received from an application installation process of the virtual machine 112 through inter-process communication (IPC), the second sub-agent 202 may determine that the installation of the application has been completed normally.

When it is determined in step 514 that the application has been installed normally, the second sub-agent 202 determines that the application installation test has succeeded, and transmits the test result to the first sub-agent 200 (516). On the other hand, when the application has not been installed normally, the second sub-agent 202 determines that the application installation test has failed, and transmits an error message including installation error web page information, an installation location of the application, and version information and registry information on the browser API received from the target system 110 to the first sub-agent 200 (518).

Figure 6:
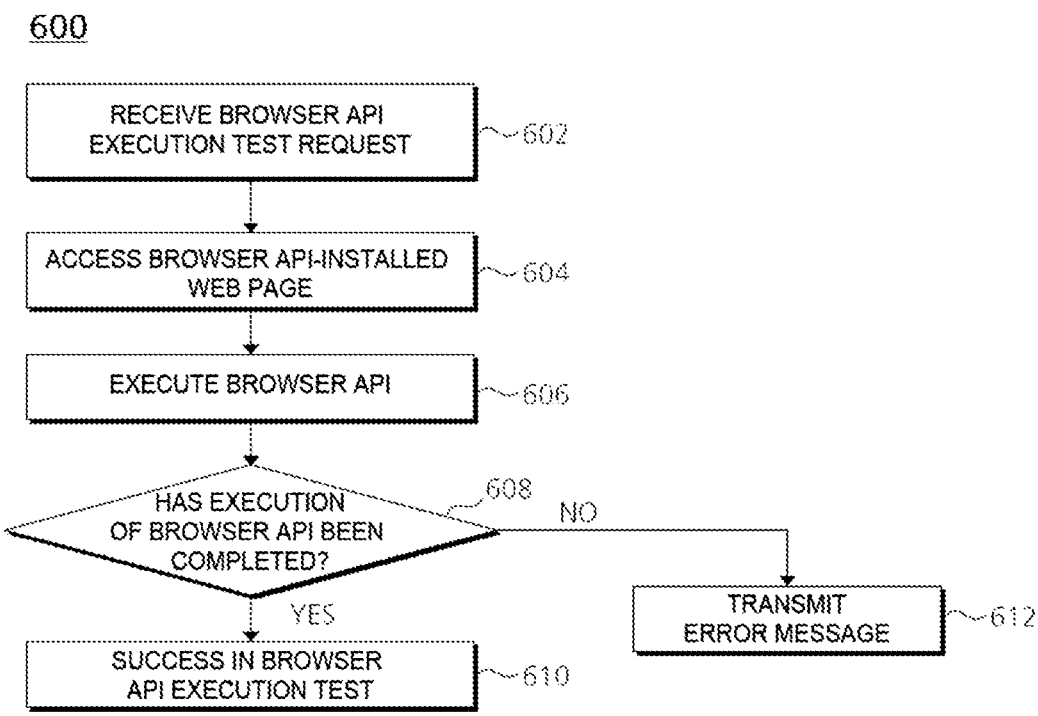
FIG. 6 is a flowchart illustrating a browser API execution simulation test process in a system for monitoring a web service according to an exemplary embodiment of the present disclosure.

FIG. 6 is a flowchart illustrating a browser API execution simulation test process 600 in the web service monitoring system 100 according to an exemplary embodiment of the present disclosure. In other words, this test is intended to test whether or not a previously installed browser API is executed normally.

The first sub-agent 200 receives an test scenario and a policy for a browser API execution simulation test from the service module 108, makes a simulation test schedule according to the received test scenario and policy, and then transmits a browser API execution test request including the schedule to the second sub-agent 202 (602).

The second sub-agent 202 receiving the test request accesses a browser API-installed web page of the target system 110 (604), and executes a browser API in the virtual machine 112 according to browser API information included in the accessed web page (606).

Subsequently, the second sub-agent 202 determines whether or not the browser API is executed normally (608). The browser API is configured to connect to a previously set specific page (referred to as a browser API execution complete web page) when the execution is completed in a user system normally, and the second sub-agent 202 has address information on the browser API execution complete web page according to the schedule received from the first sub-agent 200. Accordingly, the second sub-agent 202 can know whether or not the execution of the browser API has succeeded by comparing an address of a web page loaded after the execution of the browser API with the information. Here, when completion of download of the web page is notified by the web browser control (e.g., when a document complete event happens), the second sub-agent 202 determines that the browser API execution complete web page has been loaded normally.

When it is determined in step 608 that the browser API execution complete web page has been loaded normally, the second sub-agent 202 determines that the browser API execution test has succeeded, and transmits the test result to the first sub-agent 200 (610). On the other hand, when the browser API execution complete web page has not been loaded normally, the second sub-agent 202 determines that the browser API execution test has failed, and transmits an error message including execution error web page information, an installation location of the browser API, and version information and registry information on the browser API received from the target system 110 to the first sub-agent 200 (612).

Figure 7:
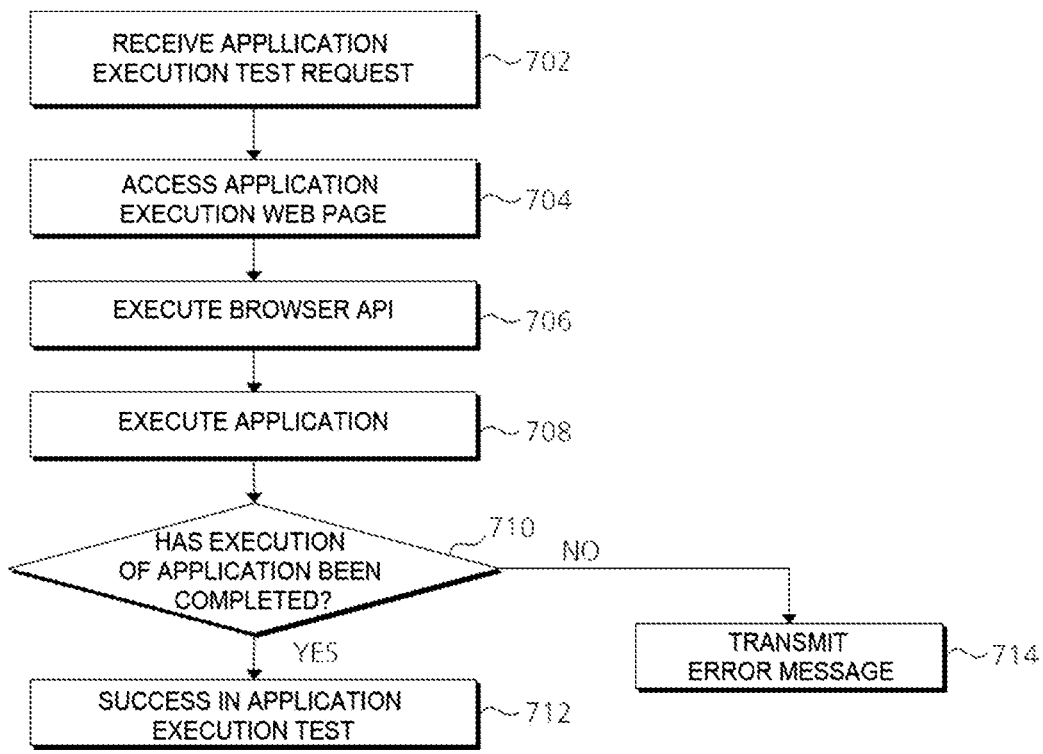
FIG. 7 is a flowchart illustrating an application execution simulation test process in a system for monitoring a web service according to an exemplary embodiment of the present disclosure.

FIG. 7 is a flowchart illustrating an application execution simulation test process 700 in the web service monitoring system 100 according to an exemplary embodiment of the present disclosure. In other words, this test is intended to test whether or not a previously installed application is executed normally.

The first sub-agent 200 receives an test scenario and a policy for an application execution simulation test from the service module 108, makes a simulation test schedule according to the received test scenario and policy, and then transmits an application execution test request including the schedule to the second sub-agent 202 (702).

The second sub-agent 202 receiving the test request accesses an application execution web page of the target system 110 (704), and executes a browser API in the virtual machine 112 according to browser API execution information included in the accessed web page (706). The browser API executed at this time is used to execute an application. As mentioned above, since it is impossible for a web browser to execute a specific application directly in a user system, in the present disclosure, a browser API is executed first, and the application is executed using the executed browser API.

Next, the second sub-agent 202 executes an application in the virtual machine 112 according to application execution information included in the executed browser API (708).

Subsequently, the second sub-agent 202 determines whether or not the application has been executed normally (710). The browser API executed in step 706 is configured to sense completion of the execution of the application and connect to a previously set specific page (referred to as an application execution complete web page) when the execution of the application is completed normally, and the second sub-agent 202 has address information on a browser API execution complete web page according to the schedule received from the first sub-agent 200. Accordingly, the second sub-agent 202 can know whether or not the execution of the application has succeeded by comparing an address of a web page loaded after the execution of the browser API with the information after the execution of the application is completed. Here, when completion of download of the web page is notified by the web browser control (e.g., when a document complete event happens), the second sub-agent 202 determines that the application execution complete web page has been loaded normally.

Alternatively, when a normal execution message is received from an application execution process of the virtual machine 112 through IPC, the second sub-agent 202 may determine that the application has been executed normally. On the other hand, when the web browser control causes an event (a pop-up message, etc.) due to an execution error of the application, or the normal execution message is not received from the application execution process for a previously set timeout period, the second sub-agent 202 may determine that the application has not been executed normally.

When it is determined in step 710 that the application has been executed normally, the second sub-agent 202 determines that the application execution test has succeeded, and transmits the test result to the first sub-agent 200 (712). On the other hand, when the application has not been executed normally, the second sub-agent 202 determines that the application execution test has failed, and transmits an error message including execution error web page information, an installation location of the application, and version information, registry information and process information on the browser API received from the target system 110 to the first sub-agent 200 (714).

Meanwhile, exemplary embodiments of the present disclosure may include a computer-readable recording medium including a program for performing the methods described in this specification in a computer. The computer-readable recording medium may separately include program commands, local data files, local data structures, or include a combination of them. The medium may be specially designed and configured for the present disclosure, or well known to those of ordinary skill in the field of computer software and available. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

According to exemplary embodiment of the present disclosure, it is possible to automatically monitor a function of a web service through an agent, and when a problem occurs, it is possible to provide information related to the problem to an administrator in real time.

In addition, according to exemplary embodiments of the present disclosure, even when a web service to be monitored requires installation of a browser API or an application, it is possible to provide a means for monitoring whether or not the browser API or the application has been installed and executed normally.

It will be apparent to those familiar with this field that various modifications can be made to the above-described exemplary embodiments of the present disclosure without departing from the spirit or scope of the present disclosure. Thus, it is intended that the present disclosure covers all such modifications provided that they come within the scope of the appended claims and their equivalents.

What is claimed is:

1. A system, for monitoring a web service, comprising:
a processor executing computer readable instructions using a memory, and implementing at least a management module configured to provide an interface to input a test scenario and a policy for a simulation test of a target system;
a database configured to store the received test scenario and policy;
a service module configured to provide the stored test scenario and policy to the agent;
an agent configured to monitor the target system by:
accessing the target system according to the test scenario and the policy,
carrying out the simulation test of the target system according to the policy, and
generating the simulation test result;
the service module further configured to provide the generated simulation test result to the management module; and
the management module further configured to output the simulation test result,
wherein:
the test scenario comprises information on a target browser application program interface (API), comprising installation information on the browser API, and
the carrying out comprises carrying out the simulation test of the target system to determine whether installing of the browser API is a normal browser API installation.

2. The system of claim 1, wherein the test scenario includes at least one of:
an access address of the target system,
account information for accessing the target system, and
information on a target application.

3. The system of claim 2, wherein the information on the target browser API and the information on the target application includes at least one of:
installation directory locations of the target browser API and the target application, and
version information and registry information on the target browser API and the target application.

4. The system of claim 1, wherein the policy includes at least one of:
a monitoring type of the target system,
a monitoring period,
a number of reattempts upon occurrence of an error during monitoring,
a log record range,
a period for checking whether the policy is changed,
a test timeout limit upon occurrence of an error, and
whether to collect an accessed page address.

5. The system of claim 1, wherein the agent includes:
a first sub-agent, configured to generate a monitoring schedule for monitoring the target system, in accordance with the test scenario and the policy; and
a second sub-agent, configured to perform the monitoring of the target system, according to the schedule;
wherein the first sub-agent provides to the service module the simulation test result generated by the second sub-agent.

6. The system of claim 5, wherein, when an amount of the memory occupied by the second sub-agent exceeds a predetermined threshold, the first sub-agent restarts the second sub-agent.

7. A method of monitoring a web service, comprising:
receiving, at an agent of a web service monitoring apparatus, a browser application program interface (API) installation test request indicating a target system;
accessing a browser API installation web page, of the target system, that includes browser API installation information, using the agent;
downloading a browser API installation file, in accordance with the browser API installation information, using the agent;
executing the browser API installation file to install a browser API in a virtual machine accessible by the agent;
making a determination, at the agent, as to whether the installing of the browser API is a normal browser API installation.

8. The method of claim 7, further comprising:
before accessing the browser API installation web page, making a determination as to whether the virtual machine includes a previously installed instance of the browser API; and
when the determination indicates the previously installed instance is included in the virtual machine, removing the previously installed instance.

9. The method of claim 7, further comprising, after the installing of the browser API, making an attempt to load a predetermined browser API installation complete web page, wherein the making of the determination, as to whether the installing of the browser API was the normal browser API installation, is based at least in part on a determination as to whether the attempt to load the predetermined browser API installation complete web page results in a normal page load.

10. The method of claim 9, wherein:
the agent further comprises a web browser control; and
the normal page load is determined based on whether a completion of a download of the predetermined browser API installation complete web page is indicated by the web browser control.

11. The method of claim 7, wherein the agent responds to the determination that the installing of the browser API is not the normal browser API installation by outputting an error message including:
installation error web page information,
an installation location of the browser API, and
version information and registry information on the browser API.

12. A method of monitoring a web service, comprising:
receiving, at an agent of a web service monitoring apparatus, an application installation test request indicating a target system;

accessing an application installation web page, of the target system, that includes browser application program interface (API) installation information, using the agent;
installing, in accordance with the browser API installation information, in a virtual machine accessible by the agent, a browser API, wherein the installed browser API includes application installation information;
downloading an application installation file from the target system according to the application installation information;
executing the application installation file to install an application in the virtual machine; and
making a determination, at the agent, as to whether the installing of the application is a normal installation.

13. The method of claim 12, further comprising:
before accessing the application installation web page, making a determination as to whether the virtual machine includes a previously installed instance of the application; and
when the determination indicates the previously installed instance is included in the virtual machine, removing the previously installed instance.

14. The method of claim 12, further comprising, after the installing of the application, making an attempt to load a predetermined application complete web page, wherein the making of the determination, as to whether the installing of the application was the normal application installation, is based on one or more of:
a determination as to whether the attempt to load the predetermined application installation complete web page results in a normal page load; and
receiving an installation normal finish message from an application installation process of the virtual machine.

15. The method of claim 14, wherein:
the agent further comprises a web browser control; and
the normal page load is determined based on whether a completion of a download of the predetermined application installation complete web page is indicated by the web browser control.

16. The method of claim 12, wherein the agent responds to the determination that the installing of the application is not the normal application installation by outputting an error message including:
installation error web page information,
an installation location of the application, and
version information and registry information on the application.

17. A method of monitoring a web service, comprising:
receiving, at an agent of a web service monitoring apparatus, a browser application program interface (API) execution test request for a target system;
accessing a browser API-installed web page, of the target system, that includes browser API information, using the agent;
executing a browser API in accordance with the browser API information;
making a determination, at the agent, as to whether the executing of the browser API is a normal browser API execution; and
in response to the determination that the executing of the browser API is not the normal browser API execution, outputting, at the agent, an error message including an installation location of the browser API.

18. The method of claim 17, further comprising, after the executing of the browser API, making an attempt to load a predetermined browser API execution complete web page, wherein the making of the determination, as to whether the executing of the browser API is the normal browser API execution, is based at least in part on whether the attempt to load the predetermined browser API execution complete web page results in a normal page load.

19. The method of claim 18, wherein:
the agent further comprises a web browser control; and
the normal page load is determined based on whether a completion of a download of the predetermined execution complete web page is indicated by the web browser control.

20. The method of claim 17, wherein the error message further includes:
execution error web page information, and
version information and registry information on the browser API received from the target system.

21. A method of monitoring a web service, comprising:
receiving, at an agent of a web service monitoring system, an application execution test request for a target system;
accessing an application-installed web page, of the target system, that includes browser application program interface (API) information, using the agent;
executing a browser API, in accordance with the browser API information, that includes application information;
executing an application in accordance with the application information;
making a determination, at the agent, as to whether executing of the application is a normal application execution; and
in response to the determination that the executing of the application is not the normal application execution, outputting, at the agent, an error message including an installation location of the browser API.

22. The method of claim 21, further comprising:
executing the application in a virtual machine; and
after the executing of the application, making an attempt to load a predetermined application execution complete web page;
wherein the making of the determination as to whether the executing of the application is the normal application execution, is based on one or more of:
a determination as to whether the attempt to load the predetermined application execution complete web page results in a normal page load; and
receiving an execution normal finish message from an application execution process of the virtual machine.

23. The method of claim 22, wherein:
the agent further comprises a web browser control; and
the normal page load is determined based on whether a completion of the download of the predetermined application execution complete web page is indicated by the web browser control.

24. The method of claim 21, wherein the error message further includes:
execution error web page information, and
version information, registry information and process information on the application received from the target system.

* * * * *